May 10, 1927.
M. J. DE ROOS
1,628,310
ELECTRICAL COOKING APPARATUS
Filed Feb. 2, 1925     4 Sheets-Sheet 2
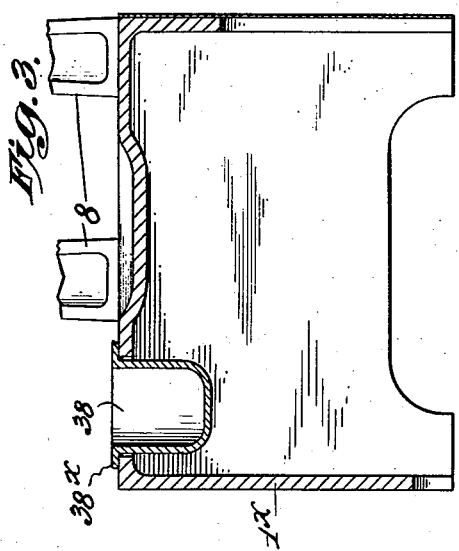
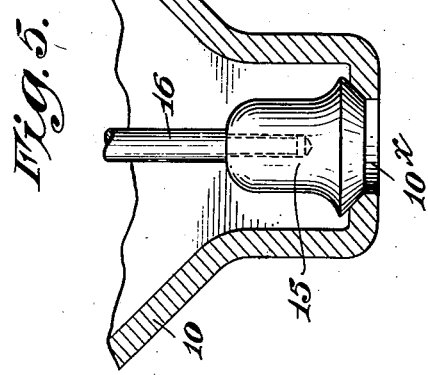
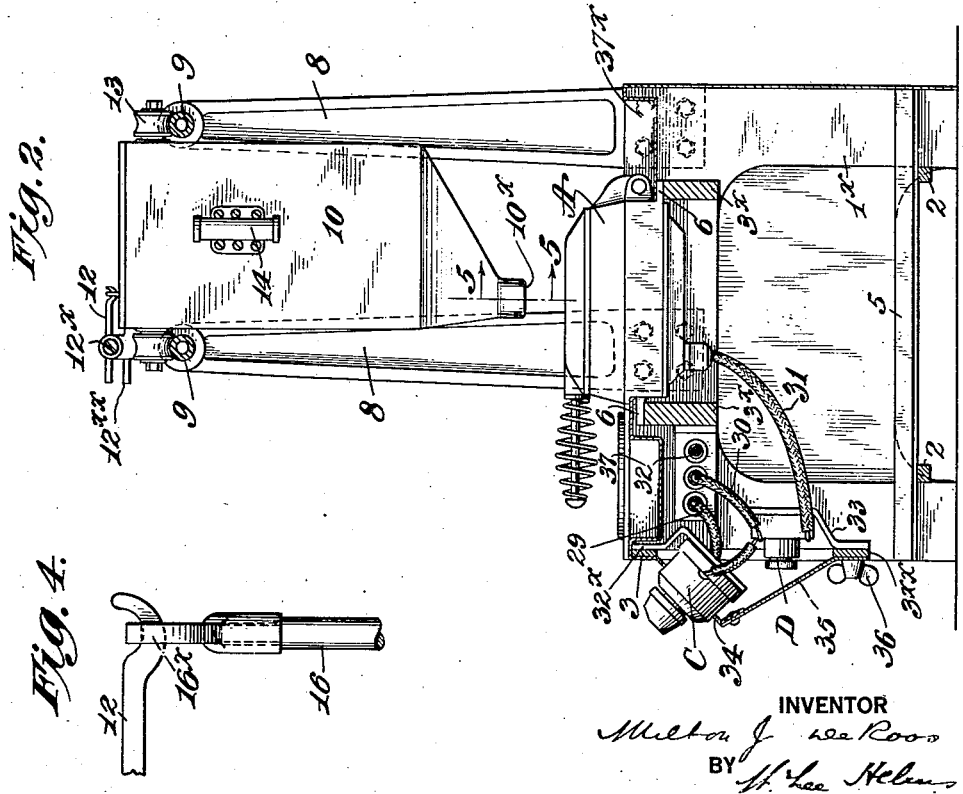
INVENTOR
Milton J. De Roos
BY
H. Lee Helms
ATTORNEY

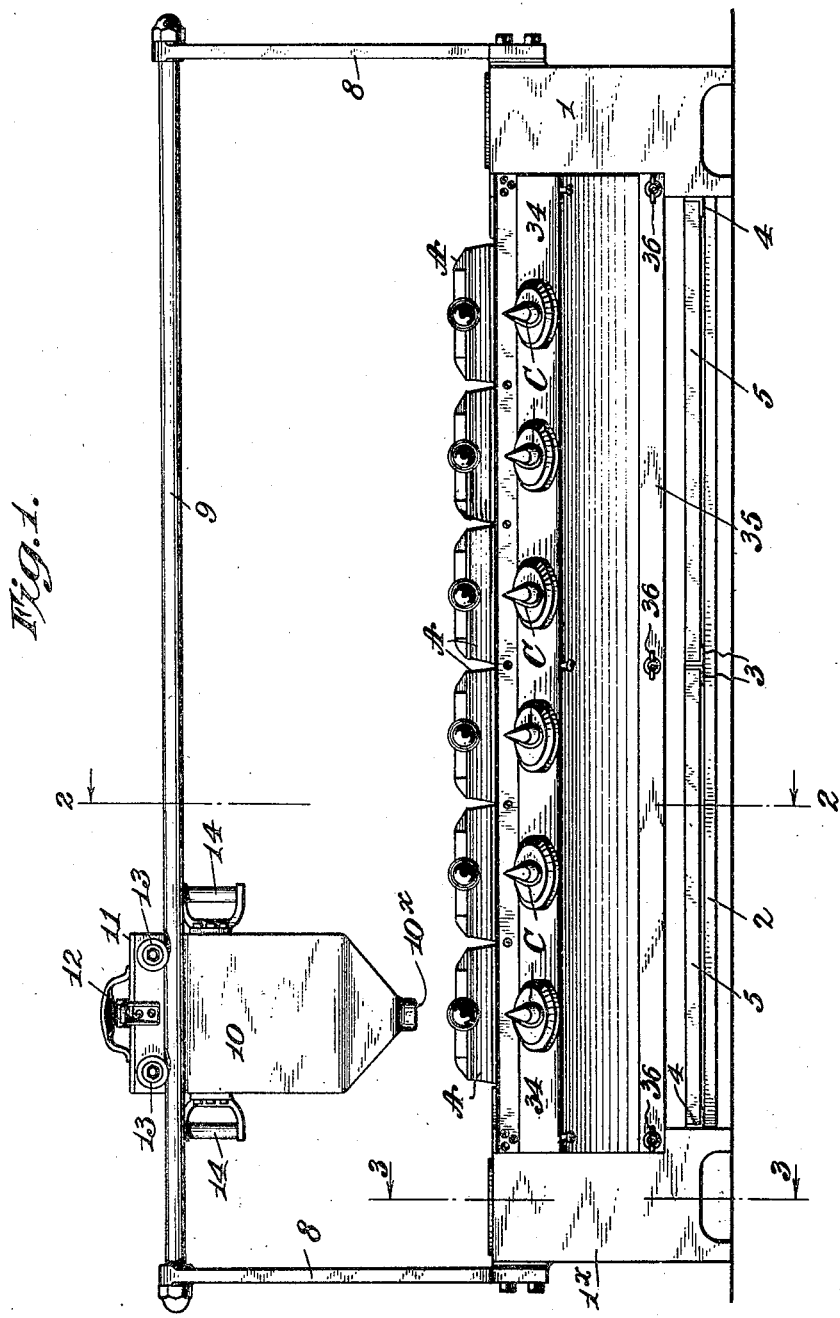

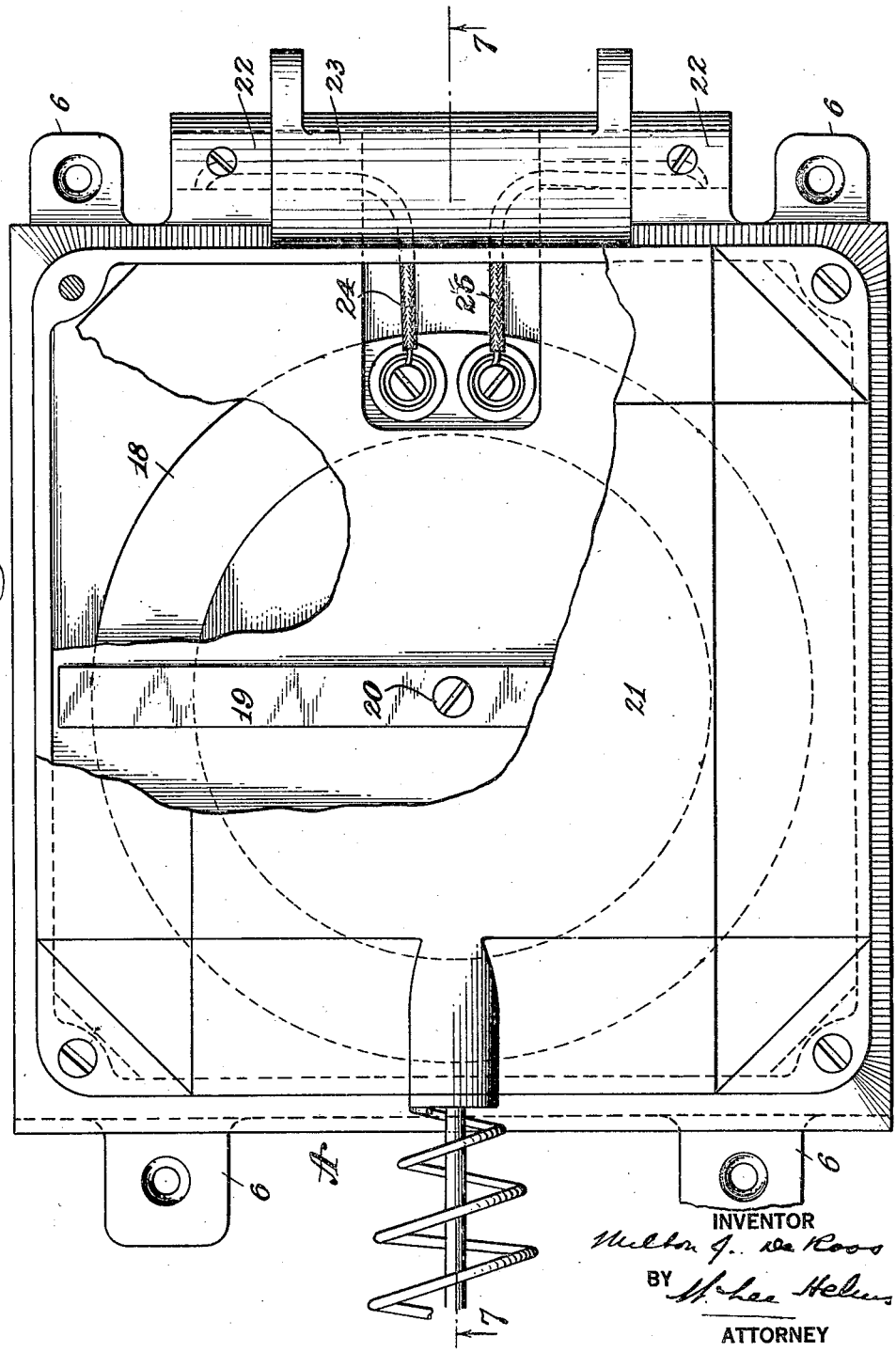

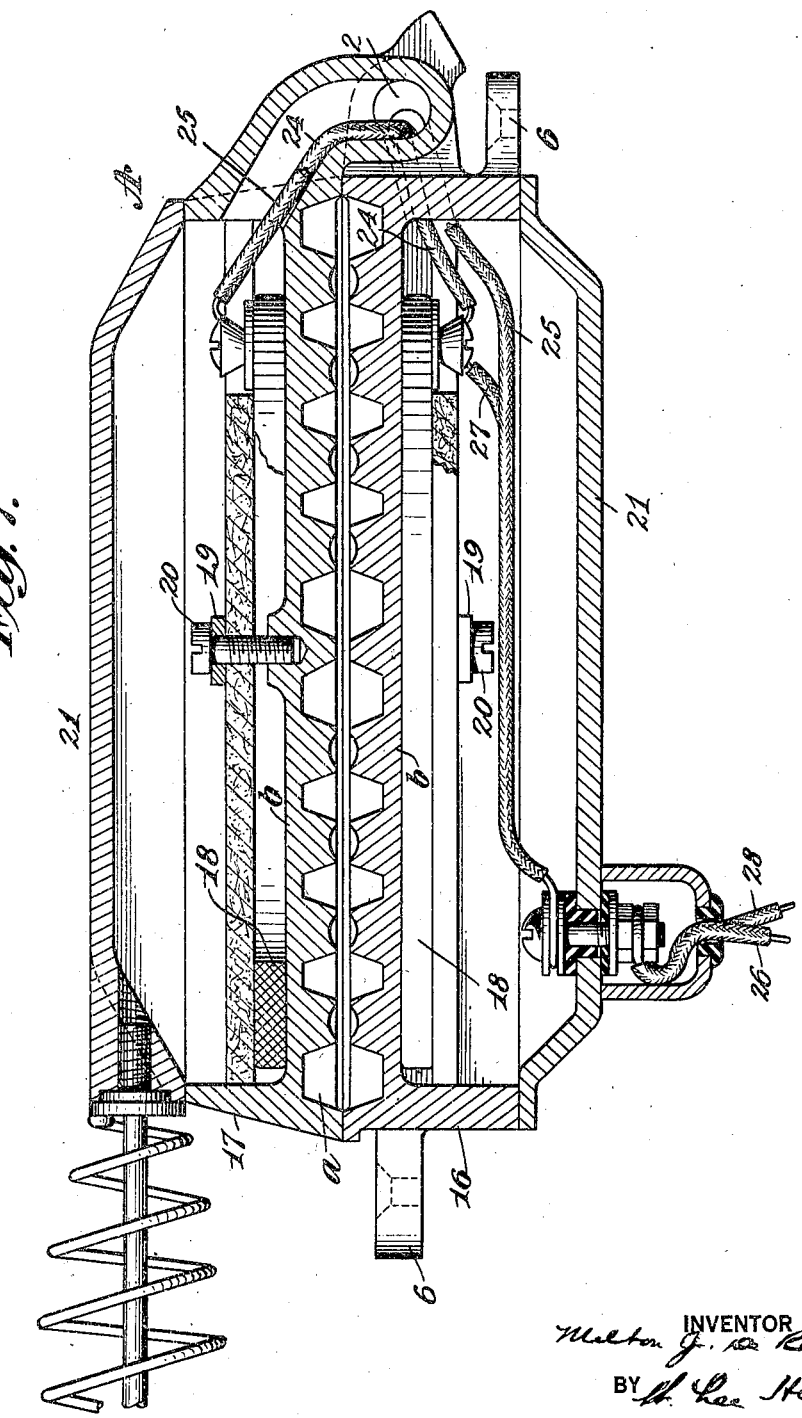

Patented May 10, 1927.

1,628,310

UNITED STATES PATENT OFFICE.

MILTON J. DE ROOS, OF NEW YORK, N. Y.

ELECTRICAL COOKING APPARATUS.

Application filed February 2, 1925. Serial No. 6,218.

This invention relates to electrical cooking apparatus and has for its object to provide a cooker for waffles or the like, in which the cooking elements and the batter-container are so arranged as to permit rapid operation. A further object is to so form the device and the electrical leads and connections that the latter are entirely protected against grease which might cause short circuit. Other objects of the invention will hereinafter appear.

The device will be understood by reference to the accompanying drawings in which—

Figure 1 is a front elevation of an apparatus constructed in accordance with the invention, and Figure 2 is a sectional elevation of the same, on the line 2—2, Figure 2, looking in the direction of the arrows;

Figure 3 is a transverse section through a member of the frame;

Figures 4 and 5 are detail sectional views showing the valve operating members of the batter container;

Figure 6 is a plan view partly in section of one of the waffle irons, and

Figure 7 is a transverse sectional view on the line 7—7, Figure 6.

Referring to the drawings, 1, 1$^x$ illustrate the end frame members which are connected by means of the lower bars 2 and other suitable longitudinal supports such as the bars 3, 3$^x$, Figure 2. Slidably mounted upon the bars 2 and guided in their movements by the angle guide irons 4 are the removable trays 5.

Resting upon the longitudinal bars 3$^x$ are a series of waffle irons A, each iron being provided with the forward and rearward lugs 6 which directly rest upon the bars.

The frame members 1$^x$ have rigidly connected thereto at each end two vertical supports 8 and each support at its upper end is apertured to receive a tubular guide member 9 adapted to support and guide the batter container 10.

The batter-container consists of a rectangular or other suitably formed box having a discharge outlet 10$^x$ and a removable cover 11. On each side of the batter-container and rotatably connected thereto are rollers 13 which are preferably channelled to conform with the round faces of the guide members 9. The batter-container is also preferably provided with a handle or handles 14 by means of which the container may conveniently be removed longitudinally of the guides 9 and in register with each one of the several waffle irons A.

The means for controlling the discharge outlet 10$^x$ of the batter-container comprise a valve head 15 having an operating rod 16 which longitudinally extends within the container and at its upper end is provided with an eye or loop 16$^x$ which is engaged by one end of a lever 12 pivoted at 12$^x$ upon the container, and having a projecting finger-piece. The finger-piece of lever 12 is located immediately over a fixed finger-piece 12$^{xx}$ also carried by the container. The operator by pressing the finger-pieces toward each other will lift the valve head 15 and permit batter to flow through the outlet 10$^x$ and into the appropriate waffle iron.

Each waffle iron A comprises a lower member 16 and an upper member 17, both preferably of cast aluminum and having a batter space $a$ which, when the iron is in operation, is tightly closed by the walls of the iron. The wall $b$ of each iron has connected thereto an electrical resistance member 18 of any suitable construction and form, the member in this instance being circular and being held in position by a clamp 19, secured by a screw 20 to an appropriate member of the iron. For convenient access to the resistance member and each electrical connection, each of the upper and lower halves of the waffle iron is provided with a detachable cover plate 21 and the two members of the iron are provided with complementary hinge units 22, 23, which are hollow, so that lead wires 24 and 25 may pass therethrough. Lead wires 24 and 25 are connected to the upper resistance member and they thence are led through the hollow hinge members through a suitable opening formed in the wall of the lower waffle iron member. The circuit is through wire 26, thence through wire 25, thence through return wire 24 to the lower resistance member, thence from the lower resistance member through wire 27 and from wire 27 to a wire 28 leading to the source of supply which may be via an adjacent waffle iron.

Referring to Figure 2, 29 indicates a wire leading to the current source, thence to the switch C and thence to the fuse D. The feed wire 30 leads from the fuse D to complete the circuit and the wire 26 is contained in a conduit 31 and passes from said conduit to the said fuse D. Return wire 32 may be employed to complete the usual three wire system.

The series of switches C, one for each waffle iron A, are supported by an angle plate 32×, which in turn is secured to the front longitudinal bar 3. The fuse elements are carried by an angle plate 33 supported by the lower longitudinal bar 3××. The switch elements project through a cover plate 34 rigidly secured upon bar 3, and a removable cover plate 35 is employed to hide the fuse blocks, this plate being held in position by the thumb nuts 36. Supported upon the longitudinal bars 3, 3× are front and rear longitudinal pans 37, 37× so that the top of the device is completely encased. The frame members 1, 1× may be provided with suitable openings to receive grease cups 38, the latter having flanged heads 38× so as to rest upon the top walls of their appropriate frame members.

It will be understood that various modifications may be made in the form and arrangement of the various units comprising the embodiment illustrated in the drawings, what I claim and desire to secure by Letters Patent being as follows:—

1. An electrical cooking apparatus comprising two end frame members and horizontal bars connecting said frame members at the top and toward the base thereof, the top bars being spaced to provide a support, a plurality of waffle irons each having a lateral projecting flange resting on said horizontal bars and each iron having electrical connections extending between and below said bars and leading to a switch at the front of the apparatus, two risers carried by each frame member, each riser being connected to the corresponding riser at the opposite end of the apparatus, by means of a horizontal rod, and a batter container disposed between the rods and depending from supporting wheels adapted to roll upon the rods.

2. An electrical cooking apparatus comprising two end frame members, a plurality of horizontal bars connecting the frame members near their tops, a plurality of horizontal bars connecting the frame members near the front faces thereof, a plurality of waffle irons held by said first named horizontal bars, an angle plate supported by said front horizontal bars and carrying a plurality of switch elements one for each waffle iron, a plurality of fuse elements supported below said switches, an angular cover plate supported by said front horizontal bars in advance of the fuse box, risers carried by each frame member, horizontal rods connecting the risers and a batter box having supporting wheels rotatable upon said rods.

3. In cooking apparatus, a set of cooking irons arranged side by side in a row, independent heat controls for said irons arranged below and in front of the same and a batter carrier mounted for travel over the rearward portions of said irons so as to leave the forward portions of said irons fully exposed and provided with a forwardly pitched discharge spout for delivering the batter to the central portions of the irons.

4. In cooking apparatus, a set of waffle irons supported side by side in a row and comprising cooperating sections hinged at the rear and provided with operating handles at the front, electric heating units carried by the sections of the irons, individual controls for the heating units located below and in front of the waffle irons, concealed wiring connections extending from said controls rearwardly to the sections of the waffle irons, a pan in front of the row of irons over the wiring connections for preventing batter extruded from the irons from reaching said wiring connections or controls and a batter carrier mounted for travel over the irons.

5. In combination, independently operable waffle irons supported in a row, and elongated pans supported in back and in front of said row in position to catch batter extruded from either end of any of said waffle irons.

6. In combination, waffle irons supported in a row and comprising sections hingedly connected at the back of the row and an elongated pan extending along the front of the row in close heat receptive relation to the irons and in position to catch batter extruded therefrom.

In testimony whereof, I have signed my name to this specification.

MILTON J. DE ROOS.